US006820009B2

(12) United States Patent
Sommer

(10) Patent No.: US 6,820,009 B2
(45) Date of Patent: Nov. 16, 2004

(54) SYSTEM AND METHOD FOR ELECTRONIC COLLECTION OF DATA ON AN AGRICULTURAL INPUT

(75) Inventor: Mark Steven Sommer, East Moline, IL (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 10/361,959

(22) Filed: Feb. 10, 2003

(65) Prior Publication Data

US 2004/0158402 A1 Aug. 12, 2004

(51) Int. Cl.⁷ .............................................. G06F 19/00
(52) U.S. Cl. ........................................................ 702/2
(58) Field of Search ...................... 702/2, 3, 5; 701/50

(56) References Cited

U.S. PATENT DOCUMENTS

| 5,478,990 | A | | 12/1995 | Montanari et al. ........... 235/375 |
|---|---|---|---|---|
| 5,668,719 | A | * | 9/1997 | Bobrov et al. .................. 702/2 |
| 5,689,418 | A | * | 11/1997 | Monson .......................... 702/2 |
| 5,699,244 | A | * | 12/1997 | Clark et al. ..................... 702/2 |
| 5,754,137 | A | * | 5/1998 | Durrstein ...................... 701/50 |
| 5,845,229 | A | | 12/1998 | Rawlins .......................... 702/2 |
| 6,002,984 | A | * | 12/1999 | Aughenbaugh ................ 702/2 |
| 6,119,531 | A | | 9/2000 | Wendte et al. ........... 73/863.52 |
| 6,199,000 | B1 | * | 3/2001 | Keller et al. .................. 701/50 |
| 6,327,569 | B1 | | 12/2001 | Reep .............................. 705/1 |
| 6,329,920 | B1 | | 12/2001 | Morrison et al. ........ 340/573.3 |
| 6,342,839 | B1 | | 1/2002 | Curkendall et al. ...... 340/573.3 |
| 6,346,885 | B1 | | 2/2002 | Curkendall .............. 340/572.4 |
| 6,569,092 | B1 | * | 5/2003 | Guichon et al. ............ 600/300 |
| 6,675,099 | B2 | * | 1/2004 | Katsuhiro ....................... 702/3 |
| 2001/0011437 | A1 | | 8/2001 | Shortridge et al. .......... 47/58.1 |
| 2001/0029996 | A1 | | 10/2001 | Robinson ..................... 141/11 |
| 2002/0091593 | A1 | | 7/2002 | Fowler ........................ 705/28 |

FOREIGN PATENT DOCUMENTS

| GB | 2 365 165 A | 2/2002 | ........... G06F/17/60 |
|---|---|---|---|
| WO | WO 02/37375 A1 | 5/2002 | |

* cited by examiner

Primary Examiner—Donald McElheny, Jr.

(57) ABSTRACT

A system and method for electronic input of data in the field comprises a reader for reading a tag associated with an agricultural input. A reading time is associated with the reading of the tag. A tag identifier of the tag and the reading time is communicated to trigger the collection of agricultural input data during performance of an agricultural input. An input identifier is assigned for a corresponding agricultural input. Data is collected substantially contemporaneously with performing the agricultural input. The collected data is stored or made available in a standard format for sharing with at least one of an application and a group of users.

20 Claims, 2 Drawing Sheets

SYSTEM AND METHOD FOR ELECTRONIC COLLECTION OF DATA ON AN AGRICULTURAL INPUT

FIELD OF THE INVENTION

This invention relates to a system and method for electronic collection of data on an agricultural input.

BACKGROUND OF THE INVENTION

An agricultural input refers to any product, resource, service, or combination thereof that is used, applied, or administered for the production of a horticultural crop, livestock, or both. In the context of horticultural crop, an agricultural input may refer to one or more of the following: planting of seeds, application of fertilizer, application of a chemical, application of water, application of an herbicide, application of a fungicide, application of an insecticide, application of lime to soil, application of organic matter to soil, administration of a crop treatment, and any other practice consistent with proper agricultural practice. In the context of livestock, an input may comprise the provision of feed to an animal, the administration of medical care to an animal, or the administration of a vaccination to an animal, among other possible treatments. If the grower or producer is able to properly document the above agricultural inputs, the documentation may support identity preservation of particular crops, compliance with environmental requirements, and management of enterprise planning, for example.

The grower may document any of the above agricultural inputs according to a manual process in which the grower jots down notes or enters data into a user interface of a computer. However, if the documentation is manual, the documentation may be incomplete and/or inaccurate. Manually entered field inputs may contain clerical errors for numerous reasons, including inattentiveness and distractions of the author. If agricultural inputs are inputted into an electronic device, the agricultural inputs may be inputted into a computer at the office before or after the operation is performed, as opposed to when agricultural inputs are applied or administered. The agricultural inputs may represent stale or premature data that does not realistically reflect the application, administration, or management of the actual agricultural input. Further, different users or the same user may use inconsistent or disparate naming conventions that impede the convenient sharing of data between people and across applications. Thus, a need exists for a method and system for collecting agricultural data on agricultural inputs in an automated or electronic manner to reduce data collection errors and foster the exchangeability of agricultural data within a business or between business entities.

SUMMARY OF THE INVENTION

A system and method for electronic input of data in the field comprises a reader for reading a tag associated with an agricultural input. A reading time is associated with the reading of the tag. A tag identifier of the tag and the reading time is communicated to trigger the collection of agricultural input data during performance of an agricultural input. An input identifier is assigned for a corresponding agricultural input. Data is collected substantially contemporaneously with performing the agricultural input. The collected data is stored or made available in a standard format for sharing with at least one of an application and a group of users.

DESCRIPTION OF THE PREFERRED EMBODIMENT

Figure 1:
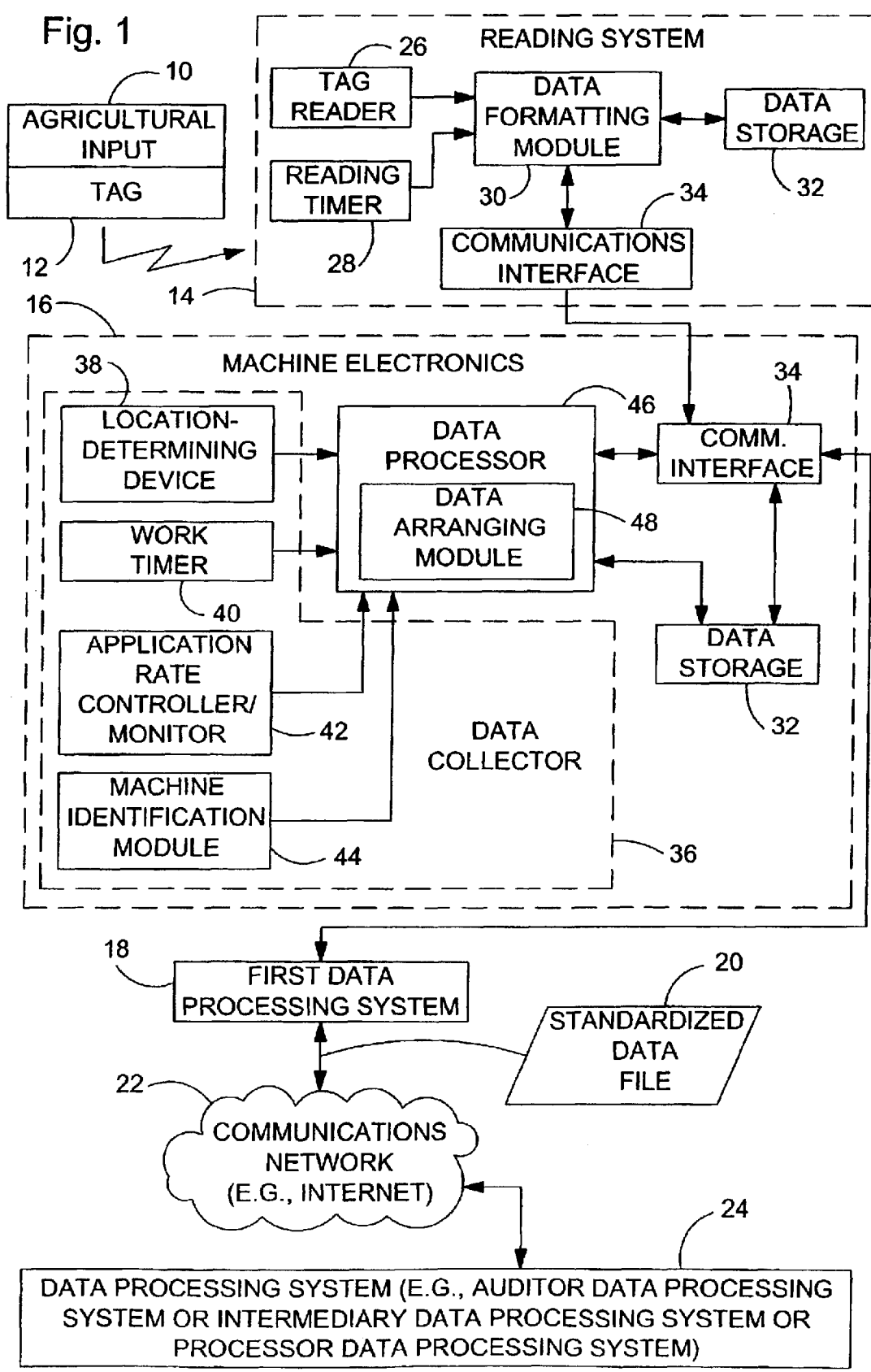
FIG. 1 is a block diagram of a system for electronic collection of input data on an agricultural input in accordance with the invention.

In accordance with the invention, FIG. 1 illustrates a block diagram of a system for electronic collection of input data on an agricultural input 10 in accordance with the invention. The system of FIG. 1 includes a reading system 14 for reading a tag 12 associated with an agricultural input 10 (e.g., a field input). The reading system 14 is coupled to machine electronics 16 of a machine (e.g., an agricultural machine, tractor, harvester, or combine). In turn, the machine electronics 16 may be coupled to a first data processing system 18 (e.g., grower data processing system) by wires, cables, transmission line, or by an electromagnetic interconnection. The first data processing system 18 may communicate with a second data processing system 24 via a communications network 22 (e.g., the Internet) or via another communications link.

The reading system 14 comprises a tag reader 26 and a reading timer 28 coupled to a data formatting module 30. Further, the reading system 14 includes data storage 32 and a communications interface 34. The data formatting module 30 communicates with the communications interface 34 and the data storage 32.

The machine electronics 16 comprises one or more data collectors 36 coupled to a data processor 46. The data collector 36 comprises any device for collecting, measuring, receiving or monitoring data related to an agricultural input. For example, the data collector 36 may include an application rate monitor, a machine setting controller, a machine setting monitor, a motion detector, or a vehicular sensor. As illustrated in FIG. 1, the data collectors 36 include a location-determining device 38 (e.g., a location-determining receiver), a work timer 40, an application rate controller 42, and a machine identification module 44. The data processor 46 supports a data arranging module 48. The data processor 46 is arranged to communicate with the communications interface 34 and data storage 32. In one embodiment, the communications interface 34 of the machine electronics 16 is coupled to the first data processing system 18.

The first data processing system 18 may store or hold the collected data until the collected data is transmitted to the second data processing system 24 via the communications network 22. In one embodiment, the first data processing system 18 may represent a grower data processing system, whereas the second data processing system 24 may represent an auditor data processing system, an intermediary data processing system, or a processor data processing system. In another embodiment, the first data processing system may represent a producer data processing system, whereas the second data processing system 24 represents the data processing system of a rendering plant, a meat packing plant, a slaughterhouse, or a meat processing plant.

In one embodiment, the system for electronic input of data in the field comprises a reader 26 for reading a tag 12 to determine a tag identifier associated with an agricultural input product (e.g., a product used in the production of a crop). A data formatting module 30 associates a reading time for reading the tag 12 with the tag identifier. A communications interface 34 communicates the tag identifier and the reading time to trigger the collection of agricultural input data during performance of an agricultural input 10. A data processor 46 or a data collector may assign an input identifier for a corresponding agricultural input 10. One or more data collectors 36 collect agricultural input data substantially contemporaneously with performing the corresponding agricultural input 10. A data arranging module 48 stores the collected data in a standard format or otherwise makes the collected data available for sharing with at least one of an application program and a group of users. In one embodiment, the collected data on the agricultural input comprises at least one of a location (e.g., geographic coordinates) of an agricultural machine performing the agricultural input 10, a date of the performance of the agricultural input 10, a time of the performance of the agricultural input 10, a beginning time of performance of the agricultural work associated with the agricultural input 10, an end time performance of the agricultural work associated with the agricultural input 10, an application rate of an agricultural input 10, a setting of a controller for an implement, a monitor, and a machine identifier. In accordance with one configuration, the standard format comprises a standardized file format containing one or more of the following: an agricultural input identifier, a field input attribute descriptor, a reading time indicator (e.g., a time stamp), location data for a corresponding agricultural input identifier, time indicators associated with corresponding location data, an application rate for a: corresponding field input identifier, application rate data versus location data, a machine setting, a sensor measurement, and a machine identifier.

The tag reader 26 may read a tag 12 of an agricultural input 10 to determine a tag identifier associated with the tag 12. The tag 12 may be placed upon an agricultural input 10, such as a package of seeds, a container of fertilizer, a container of herbicide, and a container of insecticide. The reading of the tag 12 reader 26 is associated with a reading time. The reading time may be defined as a start reading time, a completion reading time, a relative reading time, an absolute reading time, or some other reading time. The data formatting module 30 may support association of the tag 12 identifier with a respective reading time. The data formatting module 30 is capable of storing the associated tag identifier and its respective reading time in the data storage 32. The communications interface 34 is arranged to forward or transmit the associated tag identifier and its respective reading time to the machine electronics 16. After reading the tag 12, the machine electronics 16 supports data collection for data related to the reading of the tag 12 or the read agricultural input 10.

The data collector 36 or data collectors 36 may collect one or more of the following data: a location of a machine during a work time, a machine setting during a work time, an application rate or variable application rate of an agricultural input 10 during a work time, a monitored application rate of an agricultural input during a work time, a machine identifier for a machine performing work, and an implement identifier for an implement associated with the machine. In one embodiment, the location-determining device 38 collects the location (e.g., instantaneous location) of the machine during a work time or the performance of an agricultural input 10; the work timer times a starting time, an ending time, an elapsed time, or some other time measurement during the performance of the agricultural input 10; the application rate controller 42 collects application rate (e.g., a static or variable rate) of an agricultural input 10 during a work time or performance of an agricultural input 10; and the machine identification module 44 outputs a machine identifier of a machine associated with the machine electronics 16.

The data processor 46 or the data arranging module 48 receives or obtains the collected data from the data collector 36 or data collectors 36. The data arranging module 48 associates the read data from the reading system 14 with the collected data from the data collectors 36 to form arranged data. In one embodiment, the arranged data includes the following: a tag identifier, a reading time, a location, a work time, an application rate or a machine setting, and a machine identifier. The arranged data may be stored in the data storage 32 of the machine electronics 16 and/or transmitted to the first data processing system 18.

The first data processing system 18 supports communication of the arranged data to the second data processing system 24. For example, the first data processing system 18 may support transmission of the arranged data consistent with a standardized data format.

Figure 2:
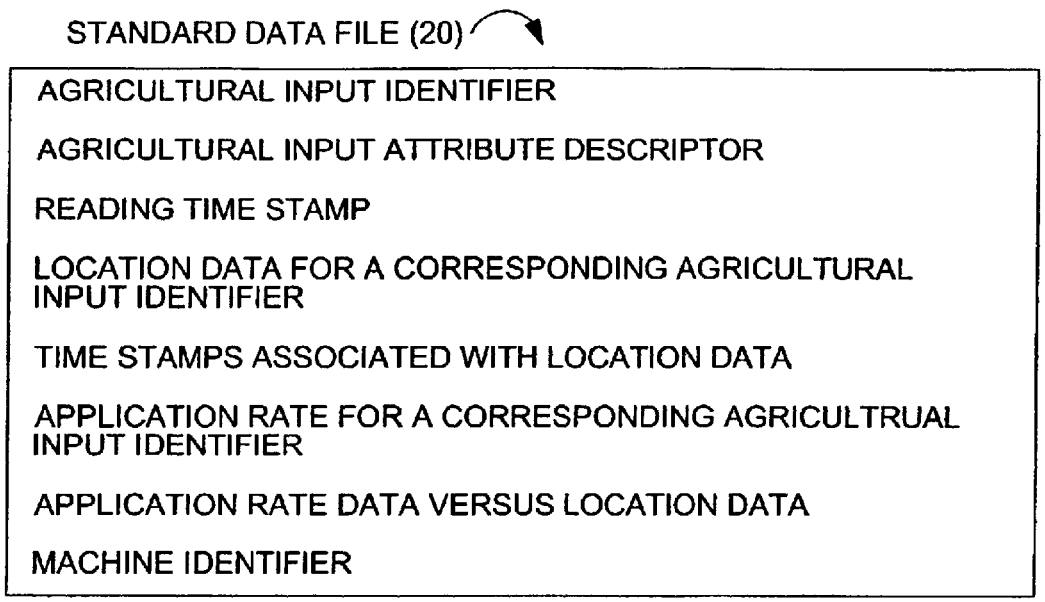
FIG. 2 is a block diagram of a data structure of a standardized data file of collected input data on an agricultural input in accordance with the invention.

FIG. 2 illustrates a standardized data format. The standardized data file 20 comprises one or more of the following: an agricultural input identifier, an agricultural input attribute descriptor, a reading time, location data for a corresponding agricultural input identifier, time stamp associated with location data, application rate for a corresponding agricultural input identifier, application rate data versus location data, and a machine identifier. Although the standardized data file 20 shows the data in a particular order and arrangement, other orders and arrangements of data may fall within the scope of the invention.

Figure 3:
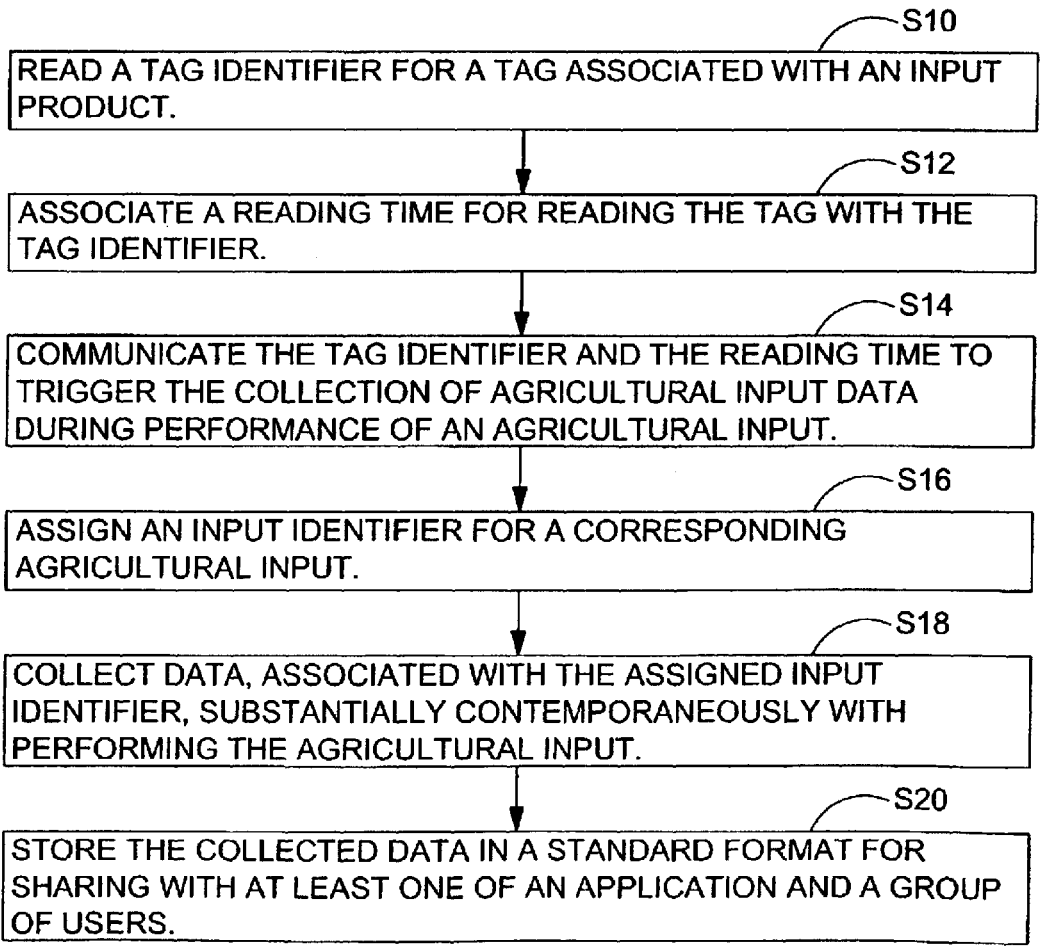
FIG. 3 is a flow chart of a method for electronic collection of the input data on an agricultural input in accordance with the invention.

FIG. 3 illustrates a method for electronic input of data in the field. The method of FIG. 3 starts in step S10.

In step S10, a reader 26 reads a tag 12 to determine a tag identifier or other data associated with an agricultural input 10 (e.g., an input product.) If the agricultural input is a product, the tag may be attached to an agricultural input or its packaging. For example, the reader 26 may read a tag for a bag of fertilizer, a container of fertilizer, a bag of seeds, a container of seeds, a container of herbicide, a sack of herbicide, a bag of insecticide, or a container of insecticide. The read tag identifier may be used to distinguish one agricultural input from another. At or about the time and date the reader 26 reads the tag, the reading timer 28 determines a reading time (e.g., time and calendar date) for corresponding tag data (e.g., a tag identifier) from reading of the tag.

The reading of the tag 12 may be accomplished in accordance with several techniques. Under a first technique, the reading of the tag 12 comprises electronically reading a tag 12 associated with the agricultural input 10. Under a second technique, the reading of the tag 12 comprises reading a bar-code label and a lot number associated with the agricultural input 10.

In step S12, a data formatting module 30 associates the reading time with the corresponding tag data (e.g., tag identifier). For instance, the data formatting module 30 associates a reading time with a tag identifier during or immediately after the tag 12 is read.

In step S14, a communications interface 34 communicates the tag identifier and the reading time to trigger the collection of agricultural input data during the performance of an agricultural input 10.

In step S16, one or more data collectors 36 may assign collected data identifier (e.g., a field) for a corresponding agricultural input 10. The identifier or identifiers may indicate whether the collected data is a location of a machine, an application rate, a machine identifier, a machine setting, or some other input identifier.

In step S18, one or more data collectors 36 collect data substantially contemporaneously with performing the agricultural input 10. In one embodiment, the collected data associates respective collected data values with corresponding collected data identifiers.

In step S20, the collected data is arranged or stored in a standard format or otherwise made available for sharing with at least one of an application program and a group of users. The collected or arranged data may be processed by using standardized nomenclature or standard fields to facilitate the exchange of data between a group of users. In one embodiment, the standard format comprises a standardized file format containing one or more of the following: an agricultural input identifier, an agricultural input attribute, a descriptor, a reading time stamp, location data for a corresponding agricultural input identifier, time stamps associated with location data, an application rate for a corresponding agricultural input identifier, an application rate data versus location data, and a machine identifier.

Following step S20, the stored data may be merged from multiple users within a group to form an aggregate informational report for an agricultural operation. Multiple users may use different systems for electronic data input that provide standardized output. The standard outputs may be combined or assembled to form an aggregate informational report of multiple users with standard nomenclature for an agricultural operation. The collected or arranged data may be processed by using standardized nomenclature or standard fields.

The method and system for electronic data input supports automatic capture of field input data using identifiers already used on agricultural inputs. For example, the identifiers may be encoded as barcodes or stored on RF (radio frequency) tags. The data processor electronically processes the data and enters it into a documentation application that can be easily accessed or shared by other applications. The electronic reader will read the identification tag on the agricultural input. Data will be parsed if necessary and stored in memory either integral or separate from the reading device. The data may also be embedded in a data message to be sent to applicable controllers on the machine for storage. The field inputs will be used in conjunction with other data collected on the machine, including the machine location.

Collecting data in the field at the time of the input reduces or eliminates errors that may be made by remembering or transcribing what was done in the past or recording what is planned for the future. Accuracy is facilitated by electronically capturing what is being done at the time it is being done. Electronic capture of field input data further enhances accuracy by following automatic pairing of the data with location information.

Electronic capture of the field input information directly from a barcode or tag on the agricultural input allows the naming of the input to be standardized. Naming will not be operator dependent, making it difficult to merge information within an operation or to compare information across operations. Electronically reading the information available on the field input also allows for a potentially greater amount of information to be collected, such as a lot number. Along with the accuracy and standardization improvements described above, the electronic collection and storage of information lends itself to more credible historical data preservation.

Having described the preferred embodiment, it will become apparent that various modifications can be made without departing from the scope of the invention as defined in the accompanying claims.

What is claimed is:

1. A method for electronic input of data associated with agricultural production, the method comprising:

reading a tag identifier for a tag associated with an input product for dispensing;

associating a reading time for reading the tag with the tag identifier;

communicating the tag identifier and the reading time to trigger the electronically automated collection of agricultural input data via one or more data collectors of a machine during the machine's performance of an agricultural input task associated with the input product;

assigning an input identifier for a corresponding agricultural input task;

collecting the agricultural input data, associated with the assigned input identifier, substantially contemporaneously with performing the agricultural input task; and arranging the collected data in a standard format for sharing with at least one of an application and a group of users.

2. The method according to claim 1 wherein the collected agricultural input data comprises at least one of a location of an agricultural machine performing the agricultural input, a date of the performance of the agricultural input, a time of the performance of the agricultural input, a beginning time of performance of the agricultural work, an end time performance of the agricultural work, an application rate of an agricultural input, a setting of a controller for an implement, a monitored rate of an agricultural input, and a machine identifier.

3. The method according to claim 1 wherein the input product comprises one or more of the following: seed, fertilizer, a chemical, a herbicide, an insecticide, a fungicide, water, a crop treatment, a vaccination, a medical treatment, and food.

4. The method according to claim 1 wherein the standard format comprises a standardized file format containing one or more of the following: an agricultural input identifier, an agricultural input attribute descriptor, a reading time stamp, location data for a corresponding agricultural input identifier, time stamps associated with location data, an application rate for a corresponding agricultural input identifier, application rate, data versus location data, and a machine identifier.

5. The method according to claim 1 further comprising: merging the arranged data from the group of users to form an aggregate informational report for an agricultural operation.

6. The method according to claim 1 wherein the reading comprises electronically reading a tag identifier from a tag on the input product.

7. The method according to claim 1 wherein the reading comprises reading a bar-code label and a lot number on a tag associated with the input product.

8. The method according to claim 1 further comprising: assembling the arranged data into an aggregate informational report with standard nomenclature for subsequent data processing.

9. A system for electronic input of data associated with agricultural production, the method comprising:

a reader for reading a tag data for a tag associated with an input product for dispensing;

a data formatting module for associating a reading time for reading the tag data;

a communications interface for communicating the tag data and the reading time to trigger the electronically automated collection of agricultural input data via one or more data collectors of a machine during the machine's performance of an agricultural input task associated with the input product;

a data collector for collecting the agricultural input data substantially contemporaneously with performing the corresponding agricultural input task; and a data arranging module for storing the collected agricultural input data in a standard format for sharing with at least one of an application and a group of users.

10. The system according to claim 9 further comprising a data processor for assigning an input identifier to collected agricultural input data for a corresponding agricultural input task and corresponding input product.

11. The system according to claim 9 wherein the collected agricultural input data comprises at least one of a location of an agricultural machine performing the agricultural input, a date of the performance of the agricultural input, a time of the performance of the agricultural input, a beginning time of performance of the agricultural work, an end time performance of the agricultural work, an application rate of an input, a setting of a controller for an implement, a monitored rate of an input, and a machine identifier.

12. The system according to claim 9 wherein the standard format comprises a standardized file format containing one or more of the following: an agricultural input identifier, an agricultural input attribute descriptor, a reading time stamp, location data for a corresponding agricultural input identifier, time stamps associated with location data, an application rate for a corresponding agricultural input identifier, application rate data versus location data, and a machine identifier.

13. The method according to claim 1 wherein the agricultural input data comprises at least one of a machine setting and a location of a machine following the reading time.

14. The method according to claim 1 wherein the tag comprises an optically readable label on packaging of the input product.

15. The system according to claim 9 wherein the agricultural input data comprises at least one of a machine setting and a location of a machine following the reading time.

16. The system according to claim 9 wherein the tag comprises an optically readable label on packaging of the input product.

17. The system according to claim 9 wherein the data collector comprises one or more of the following: a location-determining device, a work timer, an application rate monitor, an application rate controller, and a machine identification module.

18. A method for electronic input of data associated with agricultural production, the method comprising:

reading a tag identifier for a tag associated with an input product for dispensing in a field;

associating a reading time for reading the tag with the tag identifier;

communicating the tag identifier and the reading time to trigger the electronically automated collection of agricultural input data via one or more data collectors of a machine during the machine's performance of an agricultural input task associated with the input product;

collecting the agricultural input data substantially contemporaneously with performing the agricultural input task; and arranging the collected data in a standard format for sharing with at least one of an application and a group of users; the standard format comprises a standardized file format containing an agricultural input identifier, an agricultural input attribute descriptor, a reading time stamp, location data for a corresponding agricultural input identifier, time stamps associated with location data, an application rate for a corresponding agricultural input identifier, application rate data versus location data, and a machine identifier.

19. The method according to claim 18 wherein the collected agricultural input data comprises at least one of a location of an agricultural machine performing the agricultural input, a date of the performance of the agricultural input, a time of the performance of the agricultural input, a beginning time of performance of the agricultural work, an end time performance of the agricultural work, an application rate of an agricultural input, a setting of a controller for an implement, a monitored rate of an agricultural input, and a machine identifier.

20. The method according to claim 18 wherein the input product comprises one or more of the following: seed, fertilizer, a chemical, a herbicide, an insecticide, a fungicide, water, a crop treatment, a vaccination, a medical treatment, and food.

* * * * *